(12) United States Patent
Todorovic et al.

(10) Patent No.: US 10,082,079 B2
(45) Date of Patent: Sep. 25, 2018

(54) GAS-TURBINE ENGINE WITH OIL COOLER IN THE ENGINE COWLING

(71) Applicant: Rolls-Royce Deutschland Ltd & Co KG, Blankenfelde-Mahlow (DE)

(72) Inventors: Predrag Todorovic, Berlin (DE); Sascha Poenick, Rangsdorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 269 days.

(21) Appl. No.: 15/047,286

(22) Filed: Feb. 18, 2016

(65) Prior Publication Data

US 2016/0245180 A1    Aug. 25, 2016

(30) Foreign Application Priority Data

Feb. 23, 2015  (DE) .................. 10 2015 203 218

(51) Int. Cl.
*F02C 7/14* (2006.01)
*F01D 25/02* (2006.01)
(Continued)

(52) U.S. Cl.
CPC ............... *F02C 7/14* (2013.01); *B64D 15/02* (2013.01); *B64D 15/04* (2013.01); *B64D 29/00* (2013.01);
(Continued)

(58) Field of Classification Search
CPC ........ B64D 15/02; B64D 15/04; B64D 29/00; B64D 33/08; B64D 33/10;
(Continued)

(56) References Cited

U.S. PATENT DOCUMENTS 4,782,658 A    11/1988  Perry
8,235,657 B2    8/2012  Bulin et al.
(Continued)

FOREIGN PATENT DOCUMENTS

DE    102011101342 A1   11/2012
EP       1916399 A2    4/2008
(Continued)

OTHER PUBLICATIONS

German Search Report dated Nov. 20, 2015 from counterpart German App No. 10 2015 203 218.3.
(Continued)

*Primary Examiner* — Scott Walthour
(74) *Attorney, Agent, or Firm* — Shuttleworth & Ingersoll, PLC; Timothy Klima

(57) ABSTRACT

An engine cowling of an aircraft gas-turbine engine with a core engine and a bypass duct surrounding the latter, with a front cowling enclosing the bypass duct and a rear cowling movable in the axial direction, and with stator vanes arranged in the bypass duct, where recesses for removing fluid from the bypass duct are provided in the area of the stator vanes on the inside of the front cowling, where the fluid discharged through the recesses is routed by means of flow ducts through the front cowling, brought into contact with at least one heat exchanger, and subsequently discharged to the environment.

6 Claims, 5 Drawing Sheets

Figure 1:
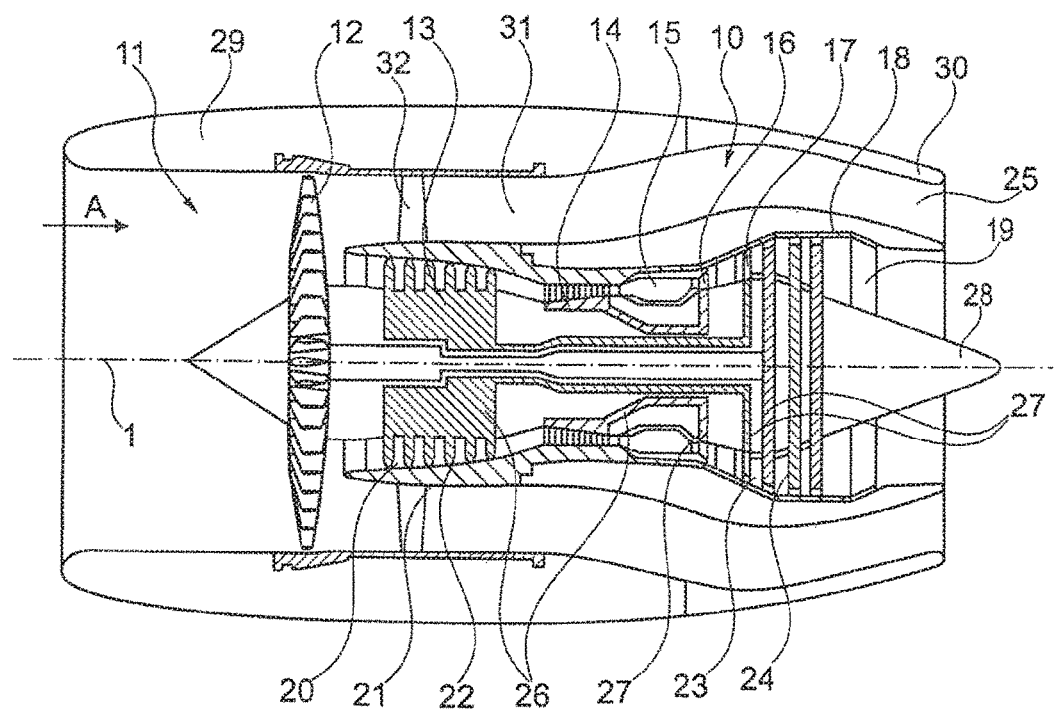

(51) Int. Cl.
| | |
|---|---|
| *B64D 29/00* | (2006.01) |
| *B64D 33/08* | (2006.01) |
| *B64D 15/04* | (2006.01) |
| *B64D 15/02* | (2006.01) |
| *F01D 25/14* | (2006.01) |
| *F02C 7/32* | (2006.01) |
| *F02K 1/64* | (2006.01) |
| *F02C 7/18* | (2006.01) |
| *B64D 33/10* | (2006.01) |
| *F02K 1/72* | (2006.01) |
| *F02K 3/06* | (2006.01) |
| *F01D 9/04* | (2006.01) |
| *F01D 25/24* | (2006.01) |
| *F02C 3/04* | (2006.01) |
| *F02C 9/18* | (2006.01) |
| *F02K 1/54* | (2006.01) |
| *F02C 7/047* | (2006.01) |
| *B64D 33/02* | (2006.01) |

(52) U.S. Cl.
CPC ............. *B64D 33/08* (2013.01); *B64D 33/10* (2013.01); *F01D 9/041* (2013.01); *F01D 25/02* (2013.01); *F01D 25/14* (2013.01); *F01D 25/24* (2013.01); *F02C 3/04* (2013.01); *F02C 7/047* (2013.01); *F02C 7/18* (2013.01); *F02C 7/32* (2013.01); *F02C 9/18* (2013.01); *F02K 1/54* (2013.01); *F02K 1/64* (2013.01); *F02K 1/72* (2013.01); *F02K 3/06* (2013.01); *B64D 2033/024* (2013.01); *B64D 2033/0233* (2013.01); *B64D 2033/0286* (2013.01); *F05D 2220/323* (2013.01); *F05D 2240/129* (2013.01); *F05D 2240/35* (2013.01); *F05D 2260/213* (2013.01); *Y02T 50/671* (2013.01); *Y02T 50/676* (2013.01)

(58) Field of Classification Search
CPC ...... B64D 2033/0233; B64D 2033/024; B64D 2033/0286; F01D 25/02; F01D 25/14; F02C 7/047; F02C 7/14; F02C 7/18; F02C 7/32; F02C 9/18; F02K 1/54; F02K 1/64; F02K 1/72; F05D 2240/129; F05D 2260/213
See application file for complete search history.

(56) References Cited

U.S. PATENT DOCUMENTS

| | | | |
|---|---|---|---|
| 8,387,362 | B2 | 3/2013 | Storage et al. |
| 8,677,733 | B2 | 3/2014 | Beardsley et al. |
| 8,938,944 | B2 | 1/2015 | Todorovic |
| 8,939,944 | B2 | 1/2015 | Todorovic |
| 2012/0285138 | A1* | 11/2012 | Todorovic ................ F02C 7/14 60/230 |
| 2013/0025259 | A1* | 1/2013 | Beardsley ................ F02K 1/72 60/226.2 |
| 2014/0369812 | A1 | 12/2014 | Cariel et al. |
| 2015/0030455 | A1 | 1/2015 | Gonidec et al. |

FOREIGN PATENT DOCUMENTS

| | | |
|---|---|---|
| EP | 2522831 A2 | 11/2012 |
| FR | 2902831 A1 | 12/2007 |
| FR | 2958974 A1 | 10/2011 |
| FR | 2970465 A1 | 7/2012 |
| FR | 2987602 A1 | 9/2013 |

OTHER PUBLICATIONS

European Search Report dated Jul. 12, 2016 for counterpart European Application No. 16156313.5.

* cited by examiner

GAS-TURBINE ENGINE WITH OIL COOLER IN THE ENGINE COWLING

This application claims priority to German Patent Application 102015203218.3 filed Feb. 23, 2015, the entirety of which is incorporated by reference herein.

This invention relates to an aircraft gas-turbine engine with a core engine surrounded by a bypass duct. The bypass duct is enclosed by a radially outer engine cowling, on the rear area of which is provided a thrust-reversing device which can be moved relative to the engine cowling.

In detail, the invention relates to an engine cowling in accordance with the features of the generic part of claim 1. The invention thus relates to an engine cowling of an aircraft gas-turbine engine with a front cowling enclosing the bypass duct and a rear cowling movable in the axial direction, and with stator vanes (OGVs) arranged in the bypass duct, where recesses for removing fluid from the bypass duct are provided in the area of the stator vanes on the inside of the front cowling.

It is known from the state of the art to attach heat exchangers either to the core engine or to the casing of the fan or in the area of struts in the bypass duct. It is known here to use either matrix coolers with a plurality of flow ducts or surface coolers with an enlarged surface.

In aircraft gas-turbine engines having a fan driven via a transmission, a very large amount of heat is generated which has to be discharged from the engine. The procedures known from the state of the art, where surface coolers or matrix coolers are used which are supplied with air from the bypass duct and from which the air is then either returned into the bypass duct or discharged to the environment, have proved to be unsuitable in respect of the overall efficiency of the aircraft engine.

The designs known from the state of the art each require an adaptation of the outer dimensions of the casing, which often has to be axially lengthened because of the oil coolers. This has the disadvantages of leading to higher weight and increased aerodynamic resistance, and hinders accessibility to radially inner assemblies. The use of coolers in the casing of the fan or in the area of struts or stator vanes inside the bypass duct impairs the design of thrust-reversing cascades and has proven to be unfavourable for that reason too.

The designs known from the state of the art furthermore result in the disadvantage that modern gas-turbine engines with a high bypass flow ratio require larger oil coolers and heat exchangers, which in the known designs can only be installed at great expense or not at all, since the installation space required is available only to a limited extent or not at all.

The known designs are thus characterized by high weight, increased structural sizes and design disadvantages.

As state of the art, reference is made to U.S. Pat. No. 8,677,733 B2, which shows an engine cowling with a thrust-reversing device, in which a rear cowling can be moved in the axial direction by means of a separate drive. The movement is in two stages: in a first stage, the rear cowling is moved only over part of the maximum possible movement length, in order to open an annular gap through which air from the bypass duct can be discharged to the environment, in order to change the cross-section of the outlet nozzle of the bypass duct. In a second position, there is a complete movement of the rear cowling in order to place, by means of a second and separate drive, the cascade elements in the thrust-reversing opening formed. At the same time, the bypass duct is closed by means of door-like blocking elements, so that the entire flow can be diverted for thrust reversal against the direction of flight.

The partial movement of the rear cowling into the first position is performed for example to avoid vibrations or flow separations at the fan, and to prevent flutter of the fan.

The object underlying the present invention is to provide an aircraft gas-turbine engine of the type mentioned at the beginning, which while being simply designed and easily and cost-effectively producible can efficiently be provided with a heat exchanger or an oil cooler and/or a pre-cooler (air-cooled air cooler).

It is a particular object to provide a solution to the above problems by a combination of features as disclosed herein. Further advantageous embodiments will become apparent from the present disclosure.

In accordance with the invention, it is thus provided that the fluid discharged through the recesses is routed by means of flow ducts through the front cowling, brought into contact with at least one heat exchanger, and subsequently discharged to the environment.

In a particularly favourable development of the invention, it is provided that the heat exchanger is arranged inside the front cowling, where preferably at least one heat exchanger is positioned in the area between the front cowling and the rear cowling. The core of the invention is therefore to split the flow paths of the air needed for the heat exchangers into two basic flow paths, i.e. one for the cruise configuration and another for a maximum take-off power of the aircraft gas-turbine engine, where the peak heat loads have to be discharged. For the cruise configuration, the air is removed from the bypass duct in the area of the stator vanes and passed to the at least one heat exchanger. The heat exchanger is either arranged directly radially outside the stator vanes in the front outer cowling in the area of the fan casing, or it is located in the inflow area of the front cowling. The air flowing through the heat exchanger is then discharged through a gap between the front and the rear cowlings or discharged to the environment in the area of the front cowling via a de-icing system arranged there.

In a configuration for maximum take-off power, an additional volume of cooling air is taken from the bypass duct and routed, together with the air which is discharged to the environment in order to change the cross-section of an outlet nozzle of the bypass duct, through a heat exchanger.

Overall, it is advantageous in the solution that the air removed from the bypass duct in the area of the stator vanes to optimize the flow is used for the heat exchangers. This therefore results in an optimized removal of heat exchanger air from the bypass duct which does not lead to any additional energy losses, since this removed air helps to improve the flow in the bypass duct.

By discharging the air through a gap between the front cowling and the rear cowling, which is opened to adjust the cross-section of the outlet nozzle at maximum take-off power, this air can be used in a particularly effective way for additional heat dissipation. It is particularly advantageous here that the fluid (cooling air) is routed, past the heat exchanger, through vanes of a cascade element intended for flow guidance and arranged in the area between the front cowling and the rear cowling, in a flow-optimized manner and discharged through the gap between the front cowling and the rear cowling. In accordance with the invention, therefore, the already existing cascade element is used, which can be designed as a classic cascade element or as a petal cascade. Additional elements to discharge the air flowing out of the heat exchanger are therefore not required. The air is instead passed through vanes of the cascades at the rear in the flow direction and a leading edge of the rear cowling designed for optimized flow. The design of the cascade element and its rear vanes, and of the rounded leading edge of the rear cowling, is originally intended to optimize the flow at maximum take-off power or during thrust-reversing operation. The result in accordance with the invention is therefore a reduction in the pressure losses inside the bypass duct, together with optimized routing of cooling air to the heat exchangers. Due to the installation space available as a result, it is possible to provide relatively large heat exchangers. This results in a synergy effect, since in a configuration of the gas-turbine engine with maximum take-off power part of the airflow from the bypass duct can be used for reduction of the nominally required cross-section of the outlet nozzle of the bypass duct (cold nozzle), and nevertheless to dependably discharge the higher heat quantity generated with this configuration of the gas-turbine engine. The overall result is therefore a considerable weight reduction and an increase in both the efficiency and the dependability of the gas-turbine engine.

Figure 2:
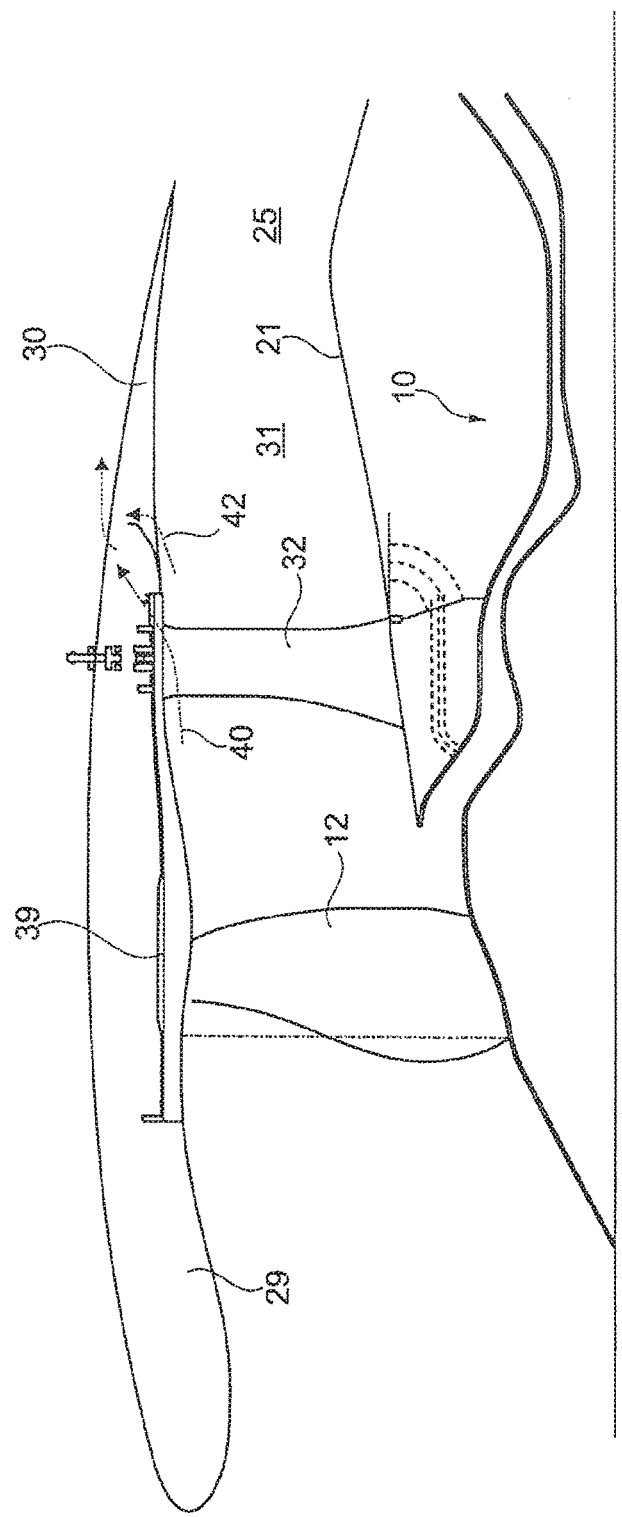
Figure 3:
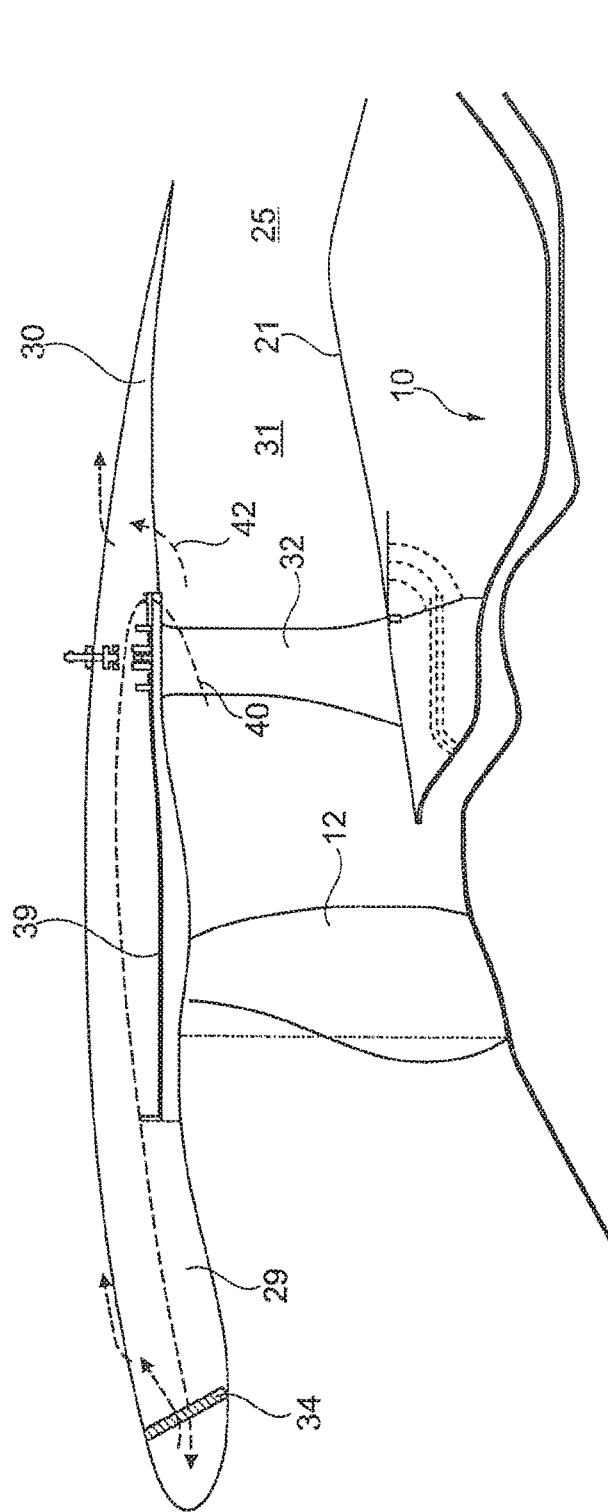
Figure 4:
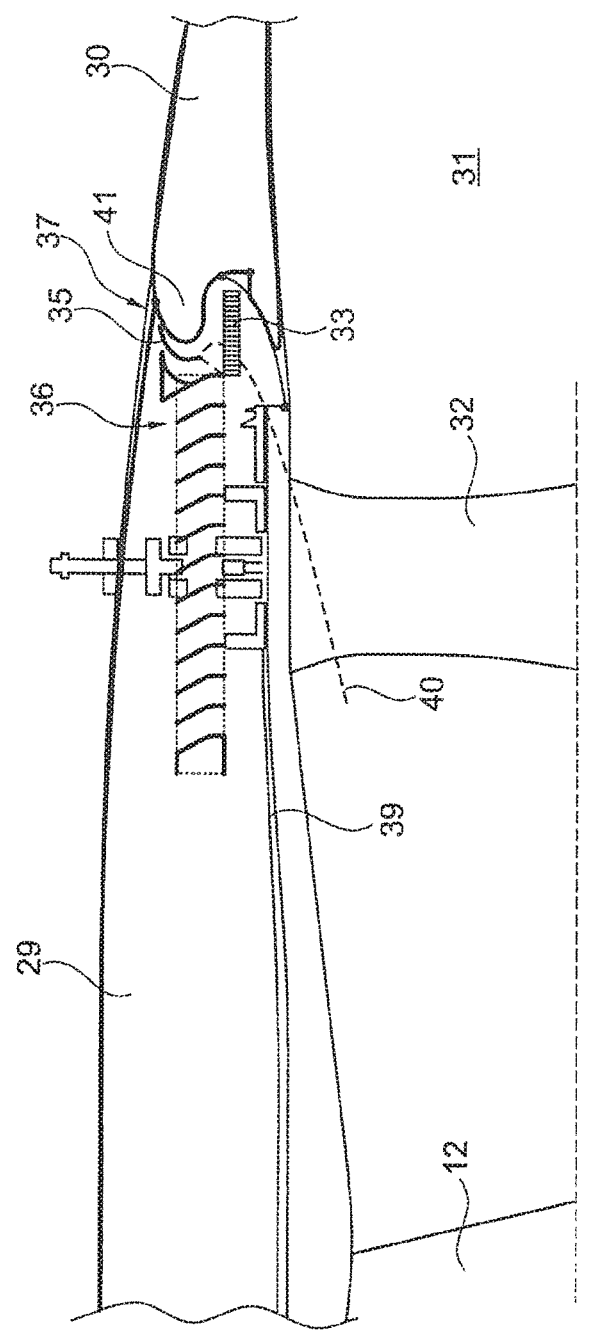
Figure 5:
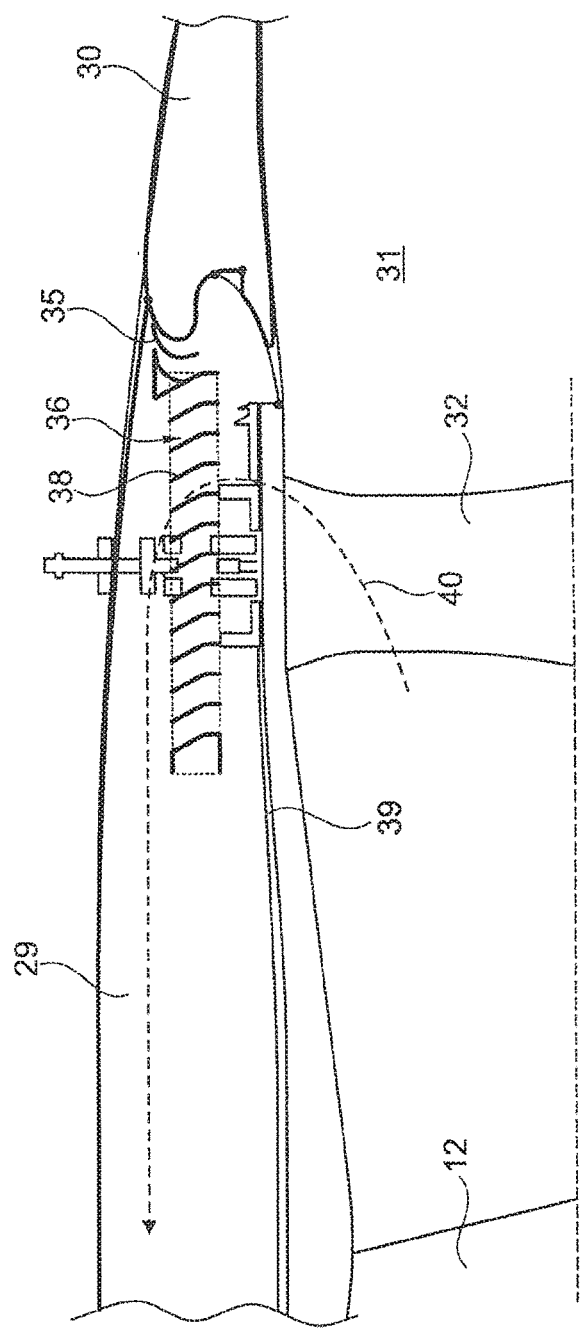

The present invention is described in the following on the basis of an exemplary embodiment. Here, FIG. 1 shows a schematic representation of a gas-turbine engine in accordance with the present invention, FIG. 2 shows a schematic sectional side view of an exemplary embodiment in a cruise configuration, FIG. 3 shows a view, by analogy with FIG. 2, in a cruise configuration, FIG. 4 shows an enlarged detail view in accordance with FIG. 2, and FIG. 5 shows an enlarged representation, by analogy with FIG. 4, of the cruise configuration in accordance with FIG. 3.

The gas-turbine engine 10 in accordance with FIG. 1 is a generally represented example of a turbomachine where the invention can be used. The engine 10 is of conventional design and includes in a flow direction A, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as a thrust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the core engine casing 21 into an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine rotor blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation. The reference numeral 28 shows an exhaust cone.

FIG. 1 furthermore shows a split of the engine cowling (nacelle) into a front cowling 29 and a rear cowling 30 movable in the axial direction relative to the engine axis or to the flow direction. A bypass duct 31 is formed between the core engine casing 21 and the outer cowlings 29 and 30. The latter has an outlet nozzle 25 which can be adjusted in its cross-section by an axial movement of the rear cowling 30 in order to influence the flow conditions at the fan 12 and in particular prevent flutter of the fan.

FIGS. 2 and 3 each show a simplified partial sectional side view in a radial plane, where in particular the bypass duct 31 is indicated which is formed between the core engine casing 21 and the front cowling 29 and the rear cowling 30. Downstream of the fan 12, stator vanes 32 are arranged, on whose radial outer areas, on a fan casing 39 mounting the stator vanes 32, recesses not shown in detail are provided to discharge cooling air 40 from the bypass duct 31 into the front cowling 29.

In the description of the invention the terms "front" and "rear" each relate to the flow direction at the engine cowling or through the bypass duct. The terms "inside" and "outside" each relate to a radial direction starting at the engine axis or its axial direction.

FIG. 2 shows a cruise configuration (cruise mode). Air inside the stator vanes 32 (OGVs) is here extracted before the end area of the fan casing 39 and passed radially to the outside through a heat exchanger (not shown). As a result, a gap 37 is formed between the front cowling 29 and the rear cowling 30, through which gap air passed through at least one rear vane 35 of a cascade element 36 and a rounded leading edge 41 of the front area of the rear cowling 30 is discharged to the environment. This air is shown in FIG. 2 by the fluid flow 42. This flow 42 is active only during take-off (configuration with maximum take-off power) and necessitates a partial rearward movement/opening of the rear cowling 30 (nacelle). The discharge of the fluid flow 42 from the bypass duct 31 is used to adjust the cross-section of the outlet nozzle 25—which in turn is necessary only during take-off (at least an enlargement). As FIG. 4 shows, a heat exchanger 33 is arranged in the area between the front cowling 29 and the rear cowling 30 and hence on the rear area of the fan casing 39, and can be designed as a surface cooler and/or as a matrix cooler. FIG. 4 shows the arrangement of the heat exchanger 33 (oil cooler) in schematic form; it can also be aligned parallel to the flow direction. The result is therefore (see FIGS. 2 and 4) that at least part of the flow discharged through the gap 37 can be taken out of the recesses in the area of the stator vanes 32.

FIGS. 3 and 5 show a further heat exchanger 34 arranged in the inflow area of the front cowling 29. As shown in FIG. 5, vanes 38 of the cascade element 36, which are used in a thrust-reversing position of the cascade element 36 for guiding the thrust-reversing flow, are used to divert the cooling air 40 and to route it against the main flow direction inside the front cowling 29 to the heat exchanger 34 (oil cooler). After the cooling air has flowed through the heat exchanger 34, it is, as shown in FIG. 3, discharged to the environment. The quantity of heat inside the heat exchanger 34 can also be used for de-icing/heating the inflow area of the front cowling 29.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber 16 High-pressure turbine
17 Intermediate-pressure turbine
18 Low-pressure turbine
19 Thrust nozzle
20 Guide vanes
21 Core engine casing
22 Compressor rotor blades
23 Stator vanes
24 Turbine rotor blades
25 Outlet nozzle
26 Compressor drum or disk
27 Turbine rotor hub
28 Exhaust cone
29 Front cowling
30 Rear cowling
31 Bypass duct
32 Stator vane
33 Heat exchanger
34 Heat exchanger
35 Vane
36 Cascade element
37 Gap
38 Vane
39 Fan casing
40 Cooling air
41 Rounded leading edge
42 Fluid flow

What is claimed is:

1. An aircraft gas-turbine engine, comprising:
a core engine;
a bypass duct surrounding the core engine;
a front cowling enclosing the bypass duct;
a rear cowling movable in an axial direction;
stator vanes arranged in the bypass duct;
recesses for removing fluid from the bypass duct, the recesses being provided in an area around the stator vanes on an inside of the front cowling;
flow ducts through the front cowling for routing the fluid removed from the bypass duct through the recesses;
a first heat exchanger, wherein the fluid routed by the flow ducts is brought into contact with the first heat exchanger and subsequently discharged to an external environment;
wherein the first heat exchanger is arranged in a forward area of the front cowling;
wherein the fluid is routed into the forward area via vanes of a thrust reversing cascade element.

2. The aircraft gas-turbine engine in accordance with claim 1, further comprising a second heat exchanger arranged in a vicinity of a gap between the front cowling and the rear cowling.

3. The aircraft gas-turbine engine in accordance with claim 2, wherein the fluid from the bypass duct is also routed past the second heat exchanger, through the vanes of the thrust reversing cascade element arranged in an area between the front cowling and the rear cowling, and discharged through the gap between the front cowling and the rear cowling.

4. The aircraft gas-turbine engine in accordance with claim 3, wherein the fluid routed past the first heat exchanger and through the forward area heats the forward area.

5. The aircraft gas-turbine engine in accordance with claim 1, wherein the fluid routed past the first heat exchanger and through the forward area heats the forward area.

6. The aircraft gas-turbine engine in accordance with claim 2, wherein the fluid routed past the first heat exchanger and through the forward area heats the forward area.

* * * * *